(12) United States Patent
Homma

(10) Patent No.: US 12,251,967 B2
(45) Date of Patent: Mar. 18, 2025

(54) TIRE

(71) Applicant: The Yokohama Rubber Co., LTD., Tokyo (JP)

(72) Inventor: Kenta Homma, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 109 days.

(21) Appl. No.: 17/995,801

(22) PCT Filed: Apr. 8, 2021

(86) PCT No.: PCT/JP2021/014862
§ 371 (c)(1),
(2) Date: Oct. 7, 2022

(87) PCT Pub. No.: WO2021/210481
PCT Pub. Date: Oct. 21, 2021

(65) Prior Publication Data
US 2023/0147893 A1 May 11, 2023

(30) Foreign Application Priority Data
Apr. 14, 2020 (JP) .................. 2020-072056

(51) Int. Cl.
*B60C 11/03* (2006.01)
*B60C 11/12* (2006.01)
(52) U.S. Cl.
CPC ...... *B60C 11/0302* (2013.01); *B60C 11/1204* (2013.01); *B60C 11/1236* (2013.01);
(Continued)
(58) Field of Classification Search
CPC . B60C 11/11; B60C 11/0302; B60C 11/0332; B60C 11/0311; B60C 11/03; B60C 11/0304; B60C 11/033
See application file for complete search history.

(56) References Cited

U.S. PATENT DOCUMENTS 5,375,639 A * 12/1994 Suzuki ............... B60C 11/0309
152/209.28
5,435,366 A 7/1995 Voigt et al.
(Continued)

FOREIGN PATENT DOCUMENTS

CN 106142998 A 11/2016
DE 10 2016 217 970 A1 3/2018
(Continued)

OTHER PUBLICATIONS

Extended European Search Report for PCT/JP2021014862, dated Jan. 8, 2024, 10 pages.

*Primary Examiner* — Cedrick S Williams
(74) *Attorney, Agent, or Firm* — Thorpe North & Western

(57) ABSTRACT

In a tire tread pattern, inclined grooves extend from a starting end in a center region including an equator toward both sides in a width direction and toward the same side in a circumferential direction to a pattern end. A periphery distance from the equator to the pattern end at an outer side in the width direction being 100%, in ranges separated from the starting end by ≤35%, from >35% to ≤50%, from >50% to ≤70% and from >70% to ≤100%, an inclination angle of the inclined grooves relative to the circumferential direction is from >40° to ≤50°, from >50° to ≤65°, from >65° to ≤80°, and from >80° to ≤90°, respectively. A circumferential-direction distance from the starting end to a terminating end of the inclined grooves is 60% to 90% of a width-direction distance.

18 Claims, 5 Drawing Sheets

(52) U.S. Cl.
CPC ............... *B60C 2011/0362* (2013.01); *B60C 2011/0367* (2013.01); *B60C 2011/1213* (2013.01); *B60C 2011/1254* (2013.01)

(56) References Cited

U.S. PATENT DOCUMENTS

| | | |
|---|---|---|
| 2012/0312438 A1 | 12/2012 | Shinzawa |
| 2017/0001477 A1 | 1/2017 | Montesello et al. |
| 2018/0281527 A1 | 10/2018 | Haertwig et al. |
| 2019/0217669 A1 | 7/2019 | Weber et al. |

FOREIGN PATENT DOCUMENTS

| | | | | |
|---|---|---|---|---|
| EP | 0 608 064 A1 | 7/1994 | | |
| EP | 609195 B1 * | 5/1996 | ......... | B60C 11/0302 |
| JP | 5-319023 A | 12/1993 | | |
| JP | 6-278412 A | 10/1994 | | |
| JP | 2644499 B2 * | 8/1997 | | |
| JP | 2000-108615 A | 4/2000 | | |
| JP | 4653832 B2 * | 3/2011 | | |
| JP | 2013-23191 A | 2/2013 | | |
| JP | 2013-184666 A | 9/2013 | | |
| JP | 2015-081076 A | 4/2015 | | |
| JP | 2016-505443 A | 2/2016 | | |
| JP | 5860625 B2 | 2/2016 | | |
| JP | 2019-142446 A | 8/2019 | | |
| WO | 2012/046724 A1 | 4/2012 | | |
| WO | WO-2015052122 A1 * | 4/2015 | ......... | B60C 11/0302 |
| WO | WO 2016/189418 A1 | 12/2016 | | |
| WO | WO 2020/012277 A1 | 1/2020 | | |

* cited by examiner

TIRE

TECHNICAL FIELD

The present technology relates to a tire with a tread pattern.

BACKGROUND ART

Tires, especially winter tires with improved running performance on snowy road surfaces, often have a block pattern in which a tread portion is divided into a plurality of blocks by circumferential grooves extending continuously in the tire circumferential direction and lateral grooves extending in the tire width direction. This pattern causes gripping force in the circumferential direction to be obtained by shear force of a snow column compacted in the lateral groove, driving performance and braking ability on the snowy road to be exhibited, lateral gripping force to be obtained by the shear force of the snow column compacted in the lateral groove, and steering stability on the snowy roads to be improved.

On the other hand, winter tires, which pass the place where snow melts and a water film is formed on the road surface, preferably have improved wet performance including drainage properties. To improve the wet performance, as a tread pattern that can efficiently drain the water accumulated in front of the rolling tire, a tread pattern having an inclined groove group in which a plurality of sets of inclined grooves, which extends from the starting end toward both sides in the tire width direction and toward the same side in the tire circumferential direction to the pattern end of the tread portion, is disposed in the tire circumferential direction may be used. The inclination angle of the inclined grooves with respect to the tire circumferential direction gradually increases from the starting end toward an outer side in the tire width direction and is close to approximately 90 degrees with respect to the tire circumferential direction at the tread pattern end.

For example, as a pneumatic tire that can provide improved braking on snow performance and wet performance, a known tread pattern in which a V-shaped crossing groove having a V-shape that projects in the tire circumferential direction, crosses the tread portion in the tire width direction, and opens to both left and right tread edge portions is provided, and a plurality of the V-shaped crossing grooves is arranged at predetermined intervals in the tire circumferential direction while directions of the V-shapes are aligned (Japan Unexamined Patent Publication No. 2015-081076 A).

Furthermore, for a tire that can provide wet road performance and icy and snowy road performance in a highly compatible manner, there is a known tread pattern in which a circumferential groove extending in the tire circumferential direction is formed, and a plurality of high-angle inclined grooves, which extends from the central portion of the tread width direction to an outer side in the tread width direction and is inclined with respect to the tire circumferential direction, is formed (Japan Patent No. 5860625 B). In this tread pattern, a low-angle inclined groove extending from the circumferential groove to an inner side in the tread width direction and having a smaller angle on the acute angle side formed with the tread width direction than the high-angle inclined groove is formed, and the high-angle groove intersects a high-angle groove formed on the opposite side with respect to the tire equator line.

SUMMARY

Japan Unexamined Patent Publication No. 2015-081076 A describing the pneumatic tire including the V-shaped crossing groove and Japan Patent No. 5860625 B describing the pneumatic tire including the high-angle inclined groove do not describe how the inclination angle of each groove with respect to the tire circumferential direction is preferably set at each position in the tire width direction.

To improve both snow performance and wet performance as compared to the related art, appropriately setting an inclination angle of the inclined groove at each position in the tire width direction is preferable.

The present technology provides a tire with improved snow performance and wet performance in a tread pattern including an inclined groove group in which a plurality of sets of inclined grooves, which extends from a starting end of a center region including a tire equator line toward both sides in a tire width direction and toward the same side in a tire circumferential direction to a pattern end of a tread portion, is disposed in the tire circumferential direction.

One aspect of the present technology is a tire. The tire includes a tread pattern including an inclined groove group in which a plurality of sets of inclined grooves, which extends from a starting end in a center region including a tire equator line toward both sides in a tire width direction and toward a first side in a tire circumferential direction across the tire equator line to a pattern end of a tread portion, is disposed in the tire circumferential direction.

A periphery distance from the tire equator line to the pattern end at one side in the tire width direction is L, an inclination angle of the inclined groove with respect to the tire circumferential direction is (a) greater than 40 degrees and 50 degrees or less in a first range from the starting end to a position separated in the tire width direction by 35% of the periphery distance L, (b) greater than 50 degrees and 65 degrees or less in a second range from an outer side in the tire width direction of the position separated from the tire equator line in the tire width direction by 35% of the periphery distance L to a position separated from the tire equator line in the tire width direction by 50% of the periphery distance L, (c) greater than 65 degrees and 80 degrees or less in a third range from an outer side in the tire width direction of the position separated from the tire equator line in the tire width direction by 50% of the periphery distance L to a position separated from the tire equator line in the tire width direction by 70% of the periphery distance L, and (d) greater than 80 degrees and 90 degrees or less in a fourth range from an outer side in the tire width direction of the position separated from the tire equator line in the tire width direction by 70% of the periphery distance L to a position separated from the tire equator line in the tire width direction by 100% of the periphery distance L, and a circumferential-direction distance along the tire circumferential direction from the starting end to a terminating end of the inclined groove in the pattern end being from 60% to 90% of a width-direction distance along the tire width direction from the starting end to the terminating end.

Preferably, the inclined grooves extend to the pattern end without intersecting a circumferential main groove which extends in the tire circumferential direction and goes around a tire circumference, and block land portions, which are each provided between adjacent inclined grooves adjacent in the tire circumferential direction of the inclined grooves disposed in each of half-tread regions on both sides of the tire equator line, contact both of the adjacent inclined grooves.

The tread pattern preferably includes two connecting grooves that connect two adjacent inclined grooves adjacent in the tire circumferential direction in the inclined groove group within a range separated from the tire equator line by from 15 to 55% of the periphery distance L in the tire width direction.

The connecting grooves preferably extend toward the first side and toward an inner side in the tire width direction.

Preferably, a portion of the connecting grooves crosses one of the adjacent inclined grooves, extends to a region of a land portion defined by the one of the adjacent inclined grooves, and is closed.

Preferably, each of the inclined grooves includes a crossing portion that crosses between two inclined grooves extending to an outer side in the tire width direction different from an outer side in the tire width direction in which each of the inclined grooves extends, and the crossing portion further crosses the tire equator line.

Preferably, each of the inclined grooves includes a crossing portion that crosses between two inclined grooves extending to an outer side in the tire width direction different from an outer side in the tire width direction in which each of the inclined grooves extends, and the crossing portion preferably further crosses the tire equator line, the connecting grooves include a first connecting groove located at a side of the tire equator line and a second connecting groove located at an outer side of the first connecting groove in the tire width direction, and the first connecting groove, the second connecting groove, and the crossing portion are inclined to the same side in the tire width direction from the tire circumferential direction, an inclination angle $\theta C$ of the crossing portion with respect to the tire circumferential direction is greater than an inclination angle $\theta A$ of the first connecting groove with respect to the tire circumferential direction, and the inclination angle $\theta A$ is greater than an inclination angle $\theta B$ of the second connecting groove with respect to the tire circumferential direction.

Preferably, the inclination angle $\theta B$ is from 0.6 to 0.8 times the inclination angle $\theta A$, and the inclination angle $\theta A$ is from 0.75 to 0.95 times the inclination angle $\theta C$.

Preferably, the tread pattern preferably includes a shallow connecting groove that connects the two adjacent inclined grooves adjacent in the tire circumferential direction in the inclined groove group within a range separated from the tire equator line by greater than 55% and 75% or less of the periphery distance L in the tire width direction, and the shallow connecting groove preferably has a groove depth from 40 to 50% of a groove depth of the adjacent inclined grooves at connection positions where the adjacent inclined grooves are connected to the shallow connecting groove.

Preferably, the tread pattern preferably includes a first block land portion surrounded by the adjacent inclined grooves, the crossing portion, and the first connecting groove and a second block land portion surrounded by the adjacent inclined grooves, the first connecting groove, and the second connecting groove between adjacent inclined grooves adjacent in the tire circumferential direction in the inclined groove group, and an area S1 of the first block land portion is smaller than an area S2 of the second block land portion.

The area S1 is preferably from 75% to 85% of the area S2.

In a region of the first block land portion, a groove portion of one inclined groove of the inclined grooves at the starting end side from the crossing portion is preferably provided as a starting groove portion, and a distance along the tire width direction between a position of a first end of the first block land portion located farthest from the starting groove portion at a side of the tire equator line and a connection position where the starting groove portion is connected to one of the adjacent inclined grooves contacting the first block land portion is L1, a distance along the tire width direction between the first end of the first block land portion and a second end of the first block land portion located at the outermost side in the tire width direction is LB1, and the distance L1 is preferably from 25% to 35% of the distance LB1.

A distance from the starting end of the starting groove portion to the connection position is L2, and the distance L2 is preferably from 40% to 45% of the distance LB1.

In a region of the second block land portion, a closed groove that extends from one of the adjacent inclined grooves and is closed without being connected to the other of the adjacent inclined grooves is preferably provided, and a distance along the tire width direction between a third end of the second block land portion located farthest from the closed groove at the side of the tire equator line and a connection position where the closed groove is connected to the one of the adjacent inclined grooves is L3, and a distance along the tire width direction between the third end of the second block land portion and a fourth end of the second block land portion located at the outermost side in the tire width direction is LB2, and the distance L3 is preferably from 25% to 35% of the distance LB2.

Preferably, a distance from a closed end of the closed groove to the connection position is L4, and the distance L4 is from 40% to 45% of the distance LB2.

The tread pattern preferably includes a plurality of sipes provided in a region of a land portion between inclined grooves adjacent in the tire circumferential direction, and a value obtained by dividing a total length (mm) of lengths projected in the inclination direction A, which is inclined at an angle $\alpha$ ($\alpha=0$ or more and less than 360 degrees) with respect to the tire width direction, of all grooves provided in the tread pattern by (ground contact width×circumferential length) (mm$^2$) is $\rho g$, a value obtained by dividing a total length (mm) projected in the inclination direction A of all the sipes provided in the tire by (ground contact width×circumferential length) (mm$^2$) is $\rho s$, an average depth (mm) of grooves is Dg, a snow traction index STI is defined by the following Formula (1), $$STI=-6.8+2202*\rho g+672*\rho s+7.6*Dg \qquad (1), \text{ and}$$

a value of the snow traction index STI at the angle $\alpha=30$ to 40 degrees is preferably from 104% to 110% of a value of the snow traction index STI at the angle $\alpha=0$ degrees.

The above-described tire is capable of improving snow performance and wet performance at the same time.

DETAILED DESCRIPTION

Hereinafter, a tire of an embodiment is described. The tire described below is, for example, a tire for a passenger vehicle. A tire for a passenger vehicle refers to a tire specified in Chapter A of the JATMA YEAR BOOK 2019 (standards of The Japan Automobile Tyre Manufacturers Association, Inc.). The tire can also be a small truck tire specified in Chapter B or a truck tire or bus tire specified in Chapter C.

The tire may be a pneumatic tire filled with air to exhibit tire performance, or a gas-filled tire filled with nitrogen, oxygen, carbon dioxide, or an inert gas instead of air. Further, instead of the gas-filled tire, the tire may be a run-flat tire that can exhibit tire performance and tire load support functions by disposing a resin support material in the tire cavity region in place of gas filling.

Tire circumferential direction described below refers to the direction (both rotation directions) to which a tread surface rotates in a case where a tire rotates about the tire rotation axis. Tire radial direction refers to the direction that extends radially orthogonal to the tire rotation axis. Outer side in the tire radial direction refers to the direction away from the tire rotation axis in the tire radial direction. Tire width direction refers to the direction parallel with the tire rotation axis direction. Outer side in the tire width direction refers to both directions away from a tire equator line of the tire.

Figure 1:
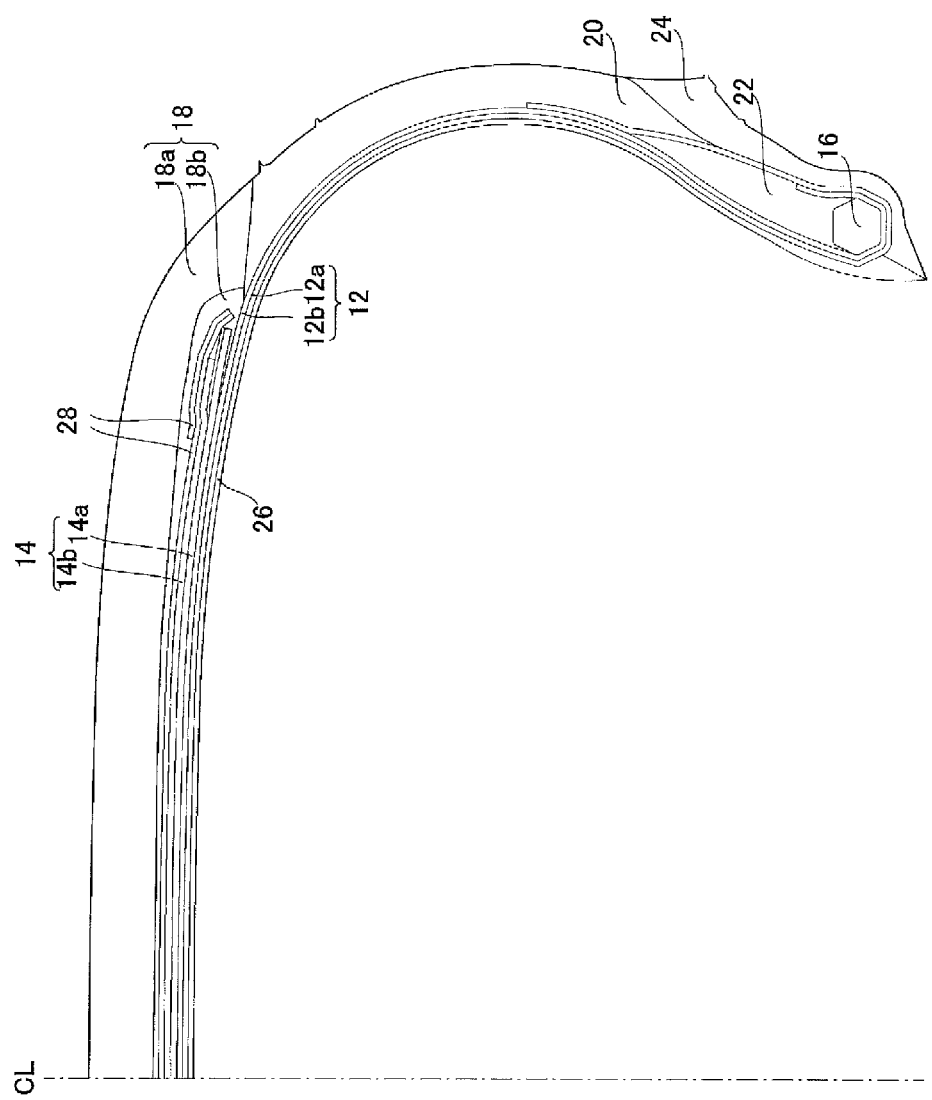
FIG. 1 is a tire cross-sectional view illustrating a cross-section of a tire according to an embodiment.

FIG. 1 is a diagram illustrating a cross-section of the tire of an embodiment along the tire radial direction including a tire rotation axis. FIG. 1 illustrates a cross-section on the right side with respect to a tire equator line CL, but the tire has a shape and structure that is axisymmetric with respect to the tire equator line CL in the cross-section.

A tire 10 illustrated in FIG. 1 includes a carcass ply layer 12, a belt layer 14, and bead cores 16 as framework members or layers of framework members and mainly includes a tread rubber member 18, side rubber members 20, bead filler rubber members 22, rim cushion rubber members 24, and an innerliner rubber member 26 around the framework members.

The carcass ply layer 12 includes carcass ply members 12a and 12b that are formed from organic fibers covered with rubber and that are wound between the pair of bead cores 16 of an annular shape so as to b e formed into a toroidal shape. In the tire 10 illustrated in FIG. 1, the carcass ply layer 12 is made of the carcass ply members 12a and 12b but may also be made of a single carcass ply member. The belt layer 14 is provided on an outer side of the carcass ply layer 12 in the tire radial direction and is composed of two belt members 14a and 14b. The belt layer 14 is constituted of rubber-covered steel cords. The steel cords are inclined at a predetermined angle of, for example, from 20 to 30 degrees with respect to the tire circumferential direction. A width in the tire width direction of the lower layer belt member 14a is greater than that of the upper layer belt member 14b. The steel cords of the two belt members 14a and 14b are inclined in opposite directions. Accordingly, the belt members 14a and 14b are crossing layers serving to suppress expansion of the carcass ply layer 12 due to inflation air pressure.

The tread rubber member 18 is provided in an outer side of the belt layer 14 in the tire radial direction. The side rubber members 20 are connected to both end portions of the tread rubber member 18 and form sidewall portions. The tread rubber member 18 is made of two layers of rubber members, namely an upper layer tread rubber member 18a provided on the outer side in the tire radial direction and a lower layer tread rubber member 18b provided on the inner side in the tire radial direction. The rim cushion rubber members 24 are respectively provided at inner ends of the side rubber members 20 in the tire radial direction and come into contact with a rim on which the tire 10 is mountable. The bead filler rubber members 22 are provided on an outer side of the bead cores 16 in the tire radial direction and interposed between a portion of the carcass ply layer 12 before the carcass ply 12 is wound around the bead cores 16 and a portion of the carcass ply layer 12 that is wound around the bead cores 16. The innerliner rubber member 26 is provided on the inner surface of the tire 10 facing a tire cavity region that is filled with air and is surrounded by the tire 10 and the rim.

In addition, the tire 10 includes a belt cover layer 28 formed from organic fiber covered with rubber that covers the belt layer 14 from the outer side in the tire radial direction of the belt layer 14.

The tire 10 has such a tire structure, but the tire structure is not limited to the tire structure illustrated in FIG. 1. In FIG. 1, the groove cross section of a tread pattern 30 described below that is formed in the tread rubber member 18 is omitted.

Tread Pattern

Figure 2:
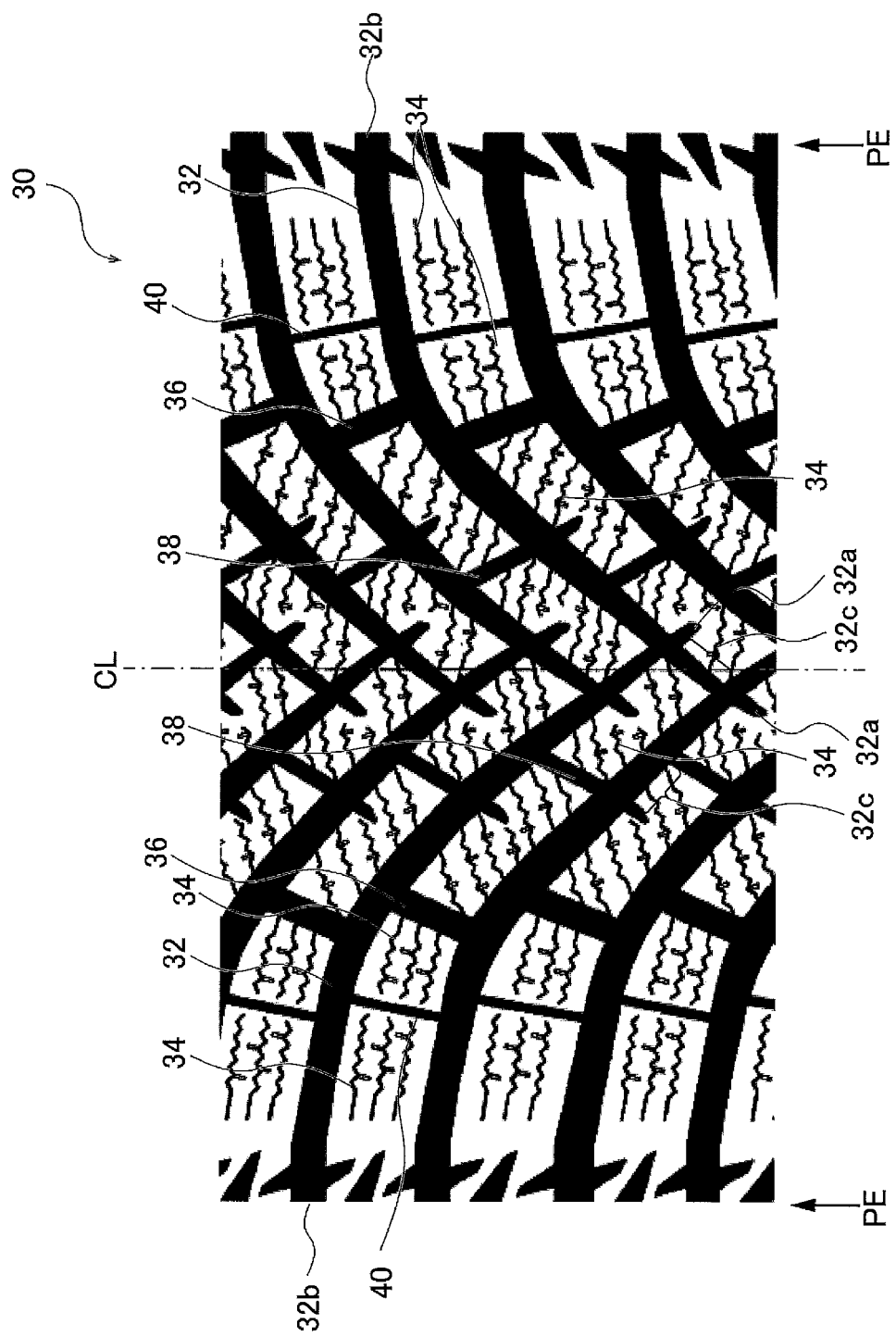
FIG. 2 is a diagram illustrating an example of a tread pattern provided in a tread portion of the tire according to the embodiment.

FIG. 2 is a developed plan view illustrating an example of a tread pattern provided in a tread portion of the tire 10 according to the embodiment. The tread pattern 30 illustrated in FIG. 2 includes an inclined groove 32 and a sipe 34.

A plurality of the inclined grooves 32 is provided to form an inclined groove group.

As illustrated in FIG. 2, the inclined grooves 32 extend from a starting end 32a of a center region including the tire equator line CL toward both sides in the tire width direction and toward a first side in the tire circumferential direction (upper side of the paper in FIG. 2) across the tire equator line CL to a pattern end PE of the tread portion. A plurality of sets of these inclined grooves is disposed in the tire circumferential direction at predetermined intervals.

Here, a center region refers to a region in the range from the tire equator line CL to positions separated therefrom on both sides in the tire width direction by 15% (preferably from 10 to 20%) of a periphery distance L that is from the tire equator line CL to the pattern end PE on one side in the tire width direction.

The starting end 32a of the inclined groove 32 is on the side opposite to the pattern end PE side which is a terminating end 32b of the inclined groove 32 with respect to the tire equator line CL in the tire width direction. Accordingly, the inclined grooves 32 cross the tire equator line CL in the middle of extending from the starting end 32a to the terminating end 32b of the pattern end PE.

The positions of the inclined grooves 32 in the tire circumferential direction are staggered between the inclined groove 32 located mainly at one side in the tire width direction with respect to the tire equator line CL and the inclined groove 32 mainly located at the other side in the tire width direction. Specifically, the starting end 32a of the inclined groove 32 located mainly on the other side in the tire width direction is located at an approximately intermediate position (position in the tire circumferential direction) between the starting ends 32a of two inclined grooves 32a adjacent in the tire circumferential direction which are located mainly on one side of the tire width direction.

The groove width of the inclined groove 32 gradually increases from the starting end 32a toward the terminating end 32b. Further, the groove depth of the inclined groove 32 is gradually shallower from the starting end 32a toward the terminating end 32b. The groove width of the inclined groove 32 is, for example, from 2.0 mm to 7.0 mm, and the groove depth thereof is, for example, from 7.5 mm to 6.5 mm.

The sipe 34 is provided in a region of a block land portion provided between two adjacent inclined grooves 32 adjacent in the tire circumferential direction in the inclined groove group. The sipe 34 has a wave-like shape and extends in a predetermined direction to improve snow performance. In the tread pattern 30 illustrated in FIG. 2, the sipe 34 has one branch portion at the bend point of the wave-like shape. The sipe 34 may be connected to the groove surrounding the block land portion or may be closed within the region of the block land portion. The distance between sipe wall surfaces of the sipe 34 is, for example, from 2.5 mm to 7.0 mm, and the depth of the sip e 34 is, for example, from 2.0 mm to 7.2 mm, and the sipe 34 can be distinguished from the inclined groove 32 by the width and depth.

Figure 3:
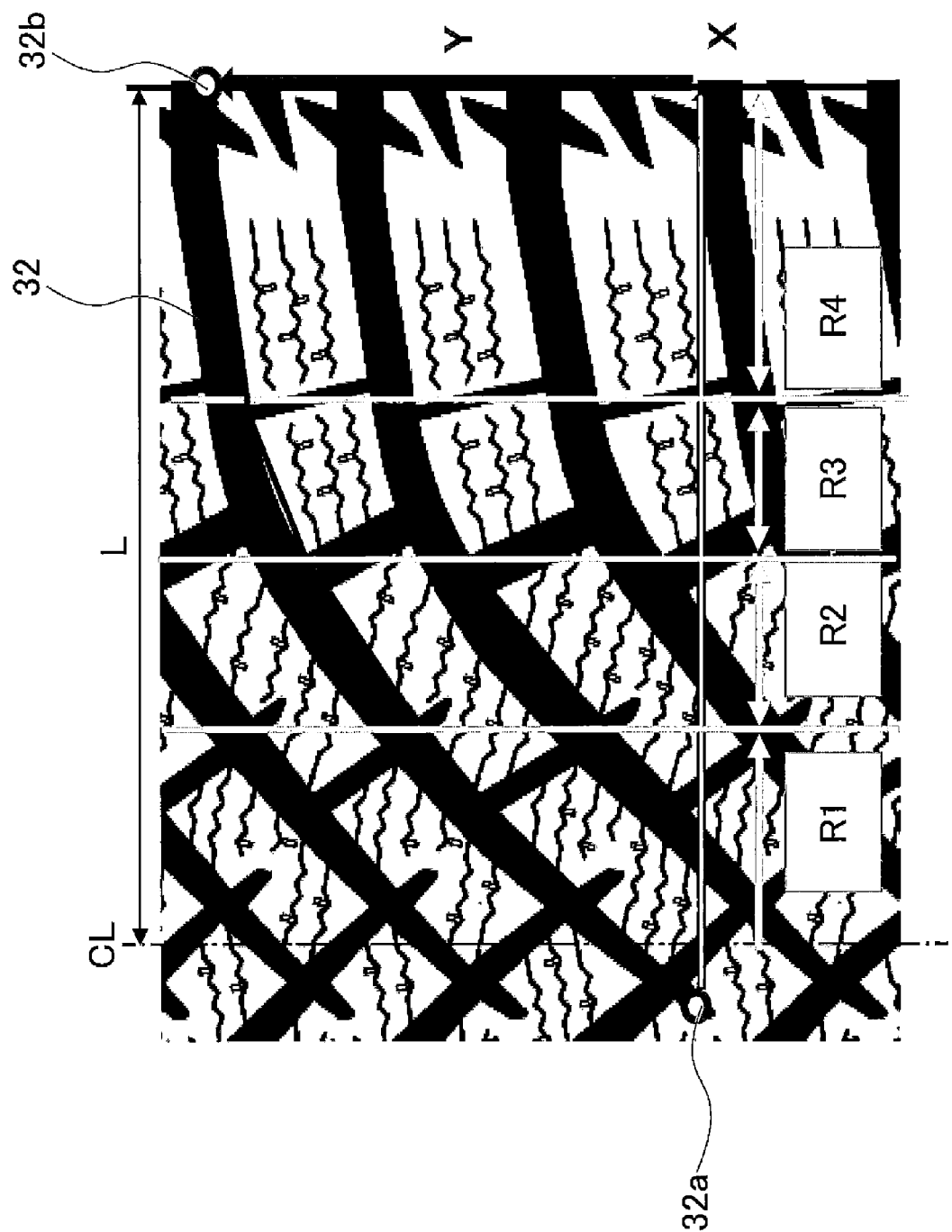
FIG. 3 is a diagram illustrating an inclination angle of an inclined groove in the first to fourth ranges according to the embodiment.

Here, an inclination angle of the inclined groove 32 with respect to the tire circumferential direction is set as follows. FIG. 3 is a diagram illustrating inclination angles of the inclined groove 32 in the first to fourth ranges described below.

(a) greater than 40 degrees and 50 degrees or less in a first range R1 from the starting end 32a to a position separated in the tire width direction by 35% of the periphery distance L, (b) greater than 50 degrees and 65 degrees or less in a second range R2 from an outer side in the tire width direction of the position separated from the tire equator line CL in the tire width direction by 35% of the periphery distance L to a position separated from the tire equator line CL in the tire width direction by 50% of the periphery distance L (not including the position separated in the tire width direction by 35% of the periphery distance L), (c) greater than 65 degrees and 80 degrees or less in a third range R3 from an outer side in the tire width direction of the position separated from the tire equator line CL in the tire width direction by 50% of the periphery distance L to a position separated in the tire width direction by 70% of the periphery distance L (not including the position separated from the tire equator line CL in the tire width direction by 50% of the periphery distance L), and (d) greater than 80 degrees and 90 degrees or less in a fourth range R4 from an outer side in the tire width direction of the position separated from the tire equator line CL in the tire width direction by 70% of the periphery distance L to a position separated from the tire equator line CL in the tire width direction by 100% of the periphery distance L (not including the position separated in the tire width direction by 70% of the periphery distance L).

Here, the inclination angle is an angle of a straight line connecting center positions of the inclined grooves 34 at positions on both sides in the tire width direction defining each of the first to fourth ranges R1 to R4, with respect to the tire circumferential direction. For example, the inclination angle in the first range R1 is an inclination angle with respect to the tire circumferential direction of a straight line connecting the starting end 32a and a center position of the inclined groove 32 at the position separated from the tire equator line CL in the tire width direction by 35% of the periphery distance L, and the inclination angle in the second range R2 is an inclination angle with respect to the tire circumferential direction of a straight line connecting the position separated from the tire equator line CL in the tire width direction by 35% of the periphery distance L and the position separated from the tire equator line CL in the tire width direction by 50% of the periphery distance L.

Furthermore, a circumferential-direction distance Y (see FIG. 3) along the tire circumferential direction from the starting end 32a to the terminating end 32b of the inclined groove 32 in the pattern end PE is from 60% to 90% of a width-direction distance X (see FIG. 3) along the tire width direction from the starting end 32a to the terminating end 32b.

By defining the inclination angle of the inclined groove 32 and overall shape of the inclined groove 32 in this way, wet performance and snow performance are improved.

Specifically, by setting the inclination angle to be greater than 50 degrees and 65 degrees or less in the second range R2, snow performance and wet performance are improved as compared with the tire in the related art.

As illustrated in FIG. 2, preferably, the inclined groove 32 extends to the pattern end PE without intersecting a circumferential main groove which extends in the circumferential direction and goes around the tire circumference, and each block land portion provided between adjacent inclined grooves adjacent in the tire circumferential direction of the inclined grooves 32 disposed in each of half-tread regions on both sides of the tire equator line CL contacts both of the adjacent inclined grooves.

The tread pattern 30 does not include the tire circumferential main groove. The tire circumferential main groove includes a linear groove that extends linearly in parallel in the tire circumferential direction and goes around the tire circumference, and a zigzag-shaped groove that extends in the tire circumferential direction and goes around the tire circumference while being displaced in a zigzag-like manner in the tire circumferential direction while the groove cross-section includes a portion that extends in parallel with the tire circumferential direction and goes around the tire circumference.

When the tread pattern 30 is provided with such a tire circumferential main groove, the flow of drain toward the pattern end PE of the inclined groove 32 stagnates at the junction of the tire circumferential main groove and the inclined groove 32, and drainage performance tends to decrease.

On the other hand, since each block land portion provided between the adjacent inclined grooves forms a block land portion that contacts both of the adjacent inclined grooves, water pushed by the block land portion when the tire 10 rolls on the wet road surface flows into the inclined groove 32 with good drainage performance, and as a result, wet performance, particularly drainage performance, are improved.

Further, as illustrated in FIG. 2, preferably, each inclined groove 32 includes a crossing portion 32c that crosses between two inclined grooves 32 extending to an outer side in the tire width direction different from the outer side in the tire width direction in which each inclined groove 32 extends, and further the crossing portion 32c crosses the tire equator line CL. In this way, water on the road surface pressed into the block land portion of the center region around the tire equator line CL flows reliably into three inclined grooves 32, and thus drainage performance of the center region where drainage is difficult is improved.

As illustrated in FIG. 2, the tread pattern 30 preferably includes two connecting grooves 36 and 38 that connect two adjacent inclined grooves adjacent in the tire circumferential direction within the range separated from the tire equator line CL by from 15 to 55% of the periphery distance L in the tire width direction.

By providing the connecting grooves 36 and 38, edge components can be increased, and snow performance can be improved, and also water can flow through the connecting grooves 36 and 38 to the inclined groove 32, and thus wet performance, particularly drainage performance is improved. The groove widths of the connecting grooves 36 and 38 are narrower than the groove width of the inclined groove 32 at portions where the connecting grooves 36 and 38 connect with the inclined grooves 32. The groove depths of the connecting grooves 36 and 38 are shallower than the groove depth of the inclined groove 32 (of the connected portions), and the groove depths of the connecting grooves 36 and 38 are, for example, 55% or less of the groove depth of the inclined groove 32 (of the connected portions).

The connecting grooves 36 and 38 are preferably grooves that extend toward a side in the tire circumferential direction (the first side) to which the inclined groove 32 extends from the starting end 32a to the terminating end 32b, and toward an inner side in the tire width direction. In this way, an angle of the tip of the land portion formed by the connecting grooves 36 and 38 and the inclined grooves 32 is a large angle (angle close to 90 degrees), and thus the angle of the tip of the land portion is an acute angle, allowing for preventing a local decrease in the rigidity of the land portion. This makes it easy to harden the snow entering the connecting grooves 36 and 38, and as a result, snow column shear force increases and snow performance is improved.

As illustrated in FIG. 2, preferably, the connecting groove 38 crosses one of the adjacent inclined grooves, extends to a region of the land portion defined by the one of the adjacent inclined grooves (in FIG. 2, the region of the block land portion adjacent to the lower side), and is closed. Since a portion of the connecting groove 38 extends so as to extend in the region of the land portion, edge components increase, and thus snow performance is improved.

Of two connecting grooves 36 and 38, the connecting groove 38 located at the side of the tire equator line CL is referred to as a first connecting groove, and the connecting groove 36 located at an outer side of the first connecting groove in the tire width direction is referred to as a second connecting groove. Hereinafter, since the first connecting groove and the connecting groove 38 are identical, the first connecting groove is also denoted by the reference sign "38", and the second connecting groove is also denoted by the reference sign "36". The first connecting groove 38 and the second connecting groove 36 are grooves extending linearly.

Figure 4A:
FIG. 4A is a diagram illustrating inclination angles of a connecting groove and a crossing portion according to the embodiment.

At this time, the crossing portion 32c, the first connecting groove 38, and the second connecting groove 36 between the adjacent inclined grooves adjacent in the tire circumferential direction are disposed in this order from the inner side in the tire width direction, and the first connecting groove 38, the second connecting groove 36, and the crossing portion 32c are inclined to the same side in the tire width direction from the tire circumferential direction. At this time, preferably, an inclination angle θC of the crossing portion 32c with respect to the tire circumferential direction is greater than an inclination angle θA of the first connecting groove 38 with respect to the tire circumferential direction, and the inclination angle θA is greater than an inclination angle θB of the second connecting groove 36 with respect to the tire circumferential direction. FIG. 4A is a diagram illustrating inclination angles of the first connecting groove 38, the second connecting groove 36, and the crossing portion 32c. For the inclination angles θA, θB, and θC, reducing the inclination angles toward the outer side in the tire width direction causes edge components extending in the tire width direction to be reduced from the center region toward the outer side in the tire width direction and edge components extending in the tire circumferential direction to be increased from the center region toward the outer side in the tire width direction, allowing lateral force to be increased in the shoulder region and breaking or accelerating force to be increased in the center region on snow-covered road surfaces.

In this case, preferably, the inclination angle θB is from 0.6 to 0.8 times the inclination angle θA, and the inclination angle θA is from 0.75 to 0.95 times the inclination angle θC. Accordingly, in addition to snow performance, wet performance, especially drainage performance, can be efficiently improved.

Further, as illustrated in FIG. 2, the tread pattern 30 includes a shallow connecting groove 40 that connects two adjacent inclined grooves adjacent in the tire circumferential direction within the range separated from the tire equator line CL by greater than 55% and 75% or less of the periphery distance L in the tire width direction. In this case, the shallow connecting groove 40 preferably has a groove depth from 40 to 50% of the groove depths of the adjacent inclined grooves that are at connection positions where the adjacent inclined grooves are connected to the shallow connecting groove 40. The shallow connecting groove 40 prevents chuck-out in which a rubber portion between two sipes 34 is separated and scattered in the shoulder region during high-speed travel. This improves snow performance during high-speed travel.

Figure 4B:
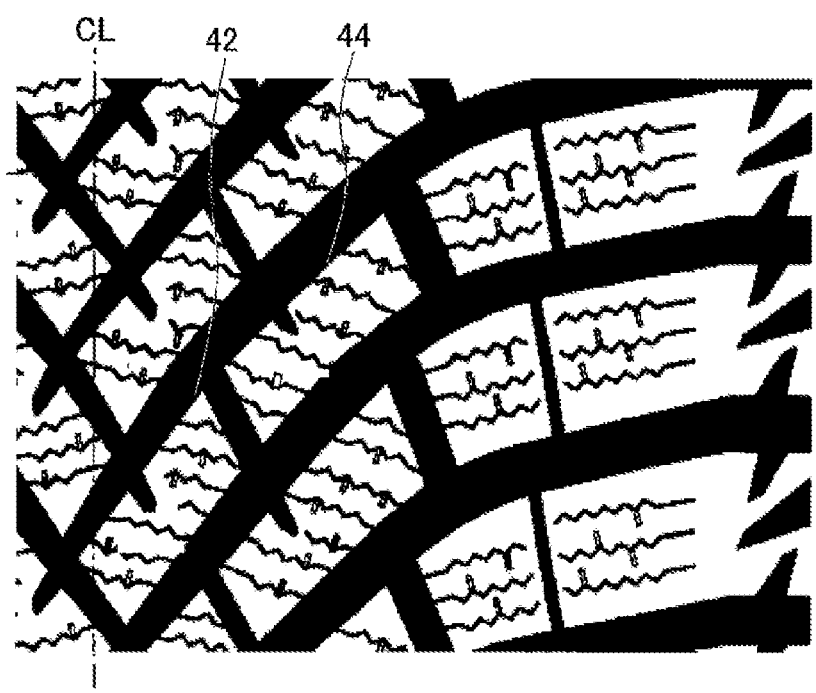
FIG. 4B is a diagram illustrating a block land portion of the tread pattern of the tire according to the embodiment.

FIG. 4B is a diagram illustrating the block land portion of the tread pattern of the tire according to the embodiment. As illustrated in FIG. 4B, the tread pattern 30 includes a first block land portion 42 surrounded by the adjacent inclined grooves, the crossing portion 32c, and the first connecting groove 38 and a second block land portion 44 surrounded by the adjacent inclined grooves, the first connecting groove 38, and the second connecting groove 36 between each adjacent inclined grooves adjacent in the tire circumferential direction. In this case, an area S1 of the first block land portion 42 is preferably smaller than an area S2 of the second block land portion 44. Reducing the first block land portion 42 allows proportion of the groove to be increased and edge components to be increased, improving snow performance. Increasing the second block land portion 44 allows a large amount of water to efficiently flow from the second block land portion 44 into the inclined groove 32, improving wet performance, particularly drainage performance. At this time, to achieve the above effect, the area S1 is preferably from 75% to 85% of the area S2.

Figure 5A:
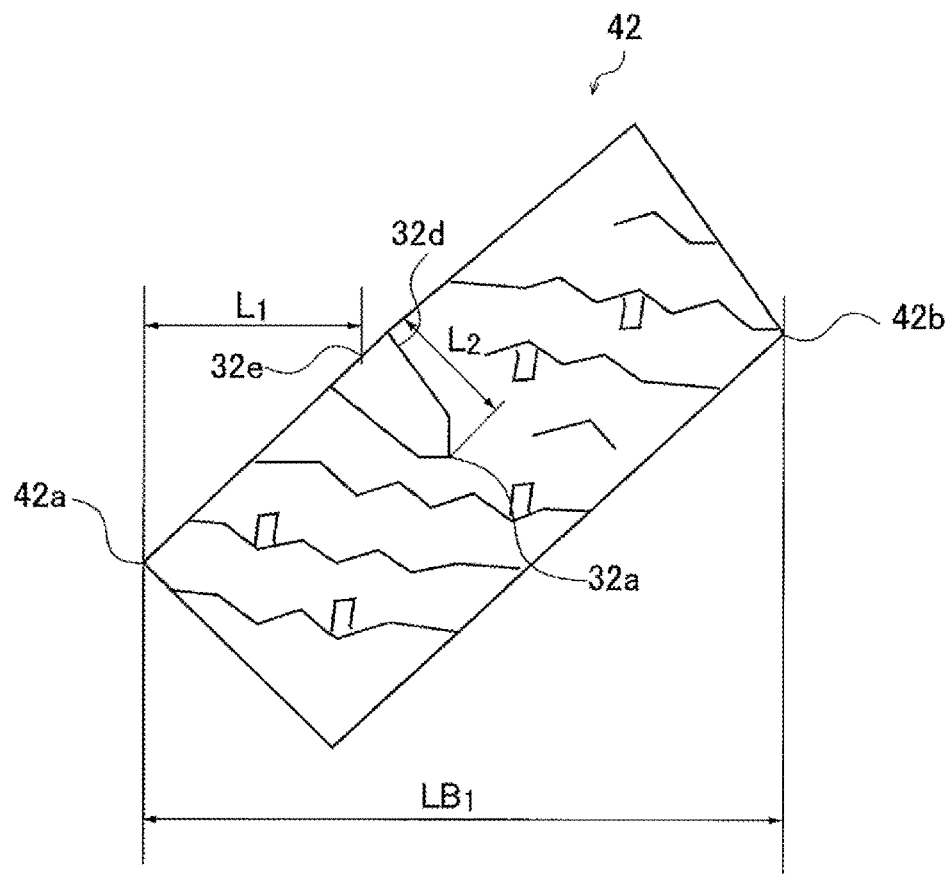
FIGS. 5A and 5B are diagrams illustrating the shape dimensions of a first block land portion and a second block land portion provided in the tread pattern of the tire according to the embodiment.
Figure 5B:
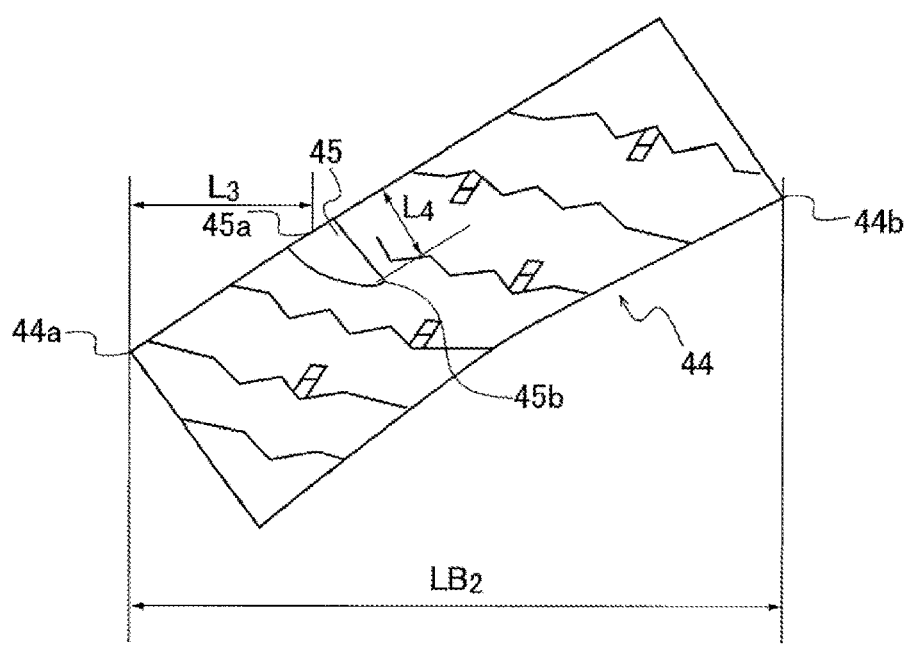

FIGS. 5A and 5B are diagrams illustrating the shape dimensions of the first block land portion and the second block land portion provided in the tread pattern of the tire according to the embodiment.

In the region of the first block land portion 42, a groove portion of one inclined groove of the inclined grooves 32 at the starting end 32a side from the crossing portion 32c is provided as a starting groove portion 32d.

When a distance along the tire width direction between the position of a first end 42a of the first block land portion 42 located farthest from the starting groove portion 32d at the side of the tire equator line CL (inner side in the tire width direction) and a connection position 32e where the starting groove portion 32d is connected to the inclined groove 32 (one of the adjacent inclined grooves) that contacts the first block land portion 42 (the connection position 32e is a center position of the groove width of the starting groove portion 32d) is L1, and a distance along the tire width direction between the first end 42a of the first block land portion 42 and a second end 42b of the first block land portion 42 located at the outermost side in the tire width direction is LB1, the distance L1 is preferably from 25% to 35% of the distance LB1.

At this time, when a distance from the starting end 32a of the starting groove portion 32d to the connection position 32e is L2, the distance L2 is preferably from 40% to 45% of the distance LB1.

Further, in the region of the second block land portion 44, a closed groove 45 that extends from one of the adjacent inclined grooves and is closed without being connected to the other of the adjacent inclined grooves is provided. When a distance along the tire width direction between a third end 44a of the second block land portion 44 located farthest from the closed groove 45 at the side of the tire equator line CL (inner side in the tire width direction) and a connection position 45a where the closed groove 45 is connected to one of the adjacent inclined grooves is L3, and a distance along the tire width direction between the third end 44a of the second block land portion 44 and a fourth end 44b of the second block land portion 44 located at the outermost side in the tire width direction is LB2, the distance L3 is preferably from 25% to 35% of the distance LB2.

At this time, when a distance from a closed end of the closed groove 45 to the connection position 45a is L4, the distance L4 is preferably from 40% to 45% of the distance LB2.

By setting the distance L1 and the distance L3 to from 25% to 35% of the distance LB1 and the distance LB2, the starting groove portion 32d and the closed groove 45 that increase edge components can be appropriately disposed in regions of the first block land portion 42 and the second block land portion 44, and thus a decrease in block rigidity is suppressed and snow performance can be improved.

Further, by setting the distance L2 and the distance L4 to from 40% to 45% of the distance LB1 and the distance LB2, the starting groove portion 32d and the closed groove 45 that increase edge components can be appropriately disposed in the regions of the first block land portion 42 and the second block land portion 44, and thus a decrease in block rigidity is suppressed and snow performance can be improved.

According to the embodiment, when a value obtained by dividing a total length (mm) of lengths projected in the inclination direction A, which is inclined at an angle $\alpha$ ($\alpha=0$ or more and less than 360 degrees) with respect to the tire width direction, of all grooves provided in the tread pattern 30 by (ground contact width×circumferential length) (mm$^2$) is $\rho g$, a value obtained by dividing a total length (mm) projected in the inclination direction A of all the sipes 34 provided in the tire 10 by (ground contact width×circumferential length) (mm$^2$) is $\rho s$, an average depth (mm) of grooves is Dg, and a snow traction index STI is defined by the following Formula (1), a value of the snow traction index STI at the angle $\alpha=30$ to 40 degrees is preferably greater than a value of the snow traction index STI at the angle $\alpha=0$ degrees and is preferably from 104% to 110% of the value of the snow traction index STI at the angle $\alpha=0$ degrees.

$$STI=-6.8+2202*\rho g+672*\rho s+7.6*Dg \tag{1}$$

By setting the values of the snow traction index STI at the angle $\alpha=30$ to 40 degrees and at the angle $\alpha=0$ degrees as described above, snow performance when turning the tire is improved as well as the snow performance when traveling straight.

To effectively exhibit snow performance and wet performance of the tire 10 in such a tread pattern 30, the JIS (Japanese Industrial Standard)—A hardness (JIS-K6253) of an upper layer tread rubber member 18a of the tire 10 at 20° C. is preferably set within a range of 50 or more and 70 or less.

Since the tire 10 has the tread pattern 30 in which the inclined groove 32 extends from the starting end 32a toward the first side in the tire circumferential direction to the terminating end 32b, the tire 10 is preferably provided with indicator information in which the opposite side of this first side is a tire rotation direction.

The indicator information of the rotation direction is displayed by marks or a ridged and grooved portion provided on the sidewall portion of the tire, for example.

EXAMPLE, COMPARATIVE EXAMPLE

To investigate the effects of the tire 10 of the embodiment, tires having various tread patterns were manufactured and mounted on a vehicle, and a snow performance test and a wet performance test were conducted. The manufactured tires are pneumatic tires with a tire size of 275/45R20. The tires were assembled on rims of rim size (20×9.5 J), and the snow performance test and the wet performance test were conducted under the conditions of an air pressure of 240 kPa and a load of 80% of the maximum load specified by JATMA (The Japan Automobile Tyre Manufacturers Association, Inc.). The vehicle used is a passenger vehicle of 3000 cc Sport Utility Vehicle (SUV).

In the snow performance test, the vehicle ran three laps of a handling course on a snow-covered road surface, the lap time for each lap was measured, and an average value of the lap time was obtained. The average value of the lap time was expressed as an index value, with the tire of Comparative Example 1 being assigned as the reference (index value of 100). The tire of Comparative Example 1 has an inclination angle of the inclined groove that has been employed in the related art.

In the wet performance test, the vehicle ran three laps of a wet handling course, lap time for each lap was measured, and an average value of the lap time was obtained. The average value of the lap time was expressed as an index value, with the tire of Comparative Example 1 being assigned as the reference (index value of 100).

Accordingly, a higher index value means better snow performance and wet performance.

In each of Comparative Examples 1 and 2 and Examples 1 to 6, the connecting grooves 36 and 38, which incline to the inner side in the tire width direction toward the first side in the tire circumferential direction, are provided within a range separated from the tire equator line CL by from 15 to 55% of the periphery distance L in the tire width direction. Further, the distance L1 and the distance L3 were set to from 25% to 35% of the distance LB1 and the distance LB2, and the distance L2 and the distance L4 were set to from 40% to 45% of the distance LB1 and the distance LB2.

Further, by adjusting the arrangement of the sipe 34, the value of the snow traction index STI at the angle α=30 to 40 degrees was set to from 104% to 110% of the value of the snow traction index STI at the angle α=0 degrees.

Table 1 below shows specifications of tread patterns manufactured using the tread pattern 30 illustrated in FIG. 2 as a reference.

TABLE 1

|  | Comparative Example 1 | Comparative Example 2 | Example 1 | Example 2 |
|---|---|---|---|---|
| Inclination angle of inclined groove in first range R1 (degrees) | 45 | 45 | 45 | 45 |
| Inclination angle of inclined groove in second range R2 (degrees) | 45 | 45 | 57 | 57 |
| Inclination angle of inclined groove in third range R3 (degrees) | 85 | 70 | 72 | 72 |
| Inclination angles of inclined groove in fourth range R4 (degrees) | 85 | 85 | 85 | 85 |
| Circumferential-direction distance Y/width-direction distance X (%) | 50 | 62 | 68 | 68 |
| Presence of shallow connecting groove 40 | No | No | No | Yes |
| Angle of $\theta_A$, $\theta_B$, $\theta_C$ (degrees) | $\theta_A = 28$ $\theta_B = 15$ $\theta_C = 40$ | $\theta_A = 28$ $\theta_B = 15$ $\theta_C = 40$ | $\theta_A = 32$ $\theta_B = 25$ $\theta_C = 35$ | $\theta_A = 32$ $\theta_B = 25$ $\theta_C = 35$ |
| Area $S_1$/area $S_2$ (%) | 68 | 69 | 71 | 72 |
| Snow performance | 100 | 101 | 102 | 104 |
| Wet performance | 100 | 99 | 101 | 101 |

|  | Example 3 | Example 4 | Example 5 | Example 6 |
|---|---|---|---|---|
| Inclination angle of inclined groove in first range R1 (degrees) | 45 | 45 | 45 | 45 |
| Inclination angle of inclined groove in second range R2 (degrees) | 57 | 57 | 57 | 57 |
| Inclination angle of inclined groove in third range R3 (degrees) | 72 | 72 | 72 | 72 |
| Inclination angles of inclined groove in fourth range R4 (degrees) | 85 | 85 | 85 | 85 |
| Circumferential-direction distance Y/width-direction distance X (%) | 68 | 68 | 68 | 68 |
| Presence of shallow connecting groove 40 | Yes | Yes | Yes | Yes |
| Angle of $\theta_A$, $\theta_B$, $\theta_C$ (degrees) | $\theta_A = 32$ $\theta_B = 25$ $\theta_C = 35$ | $\theta_A = 32$ $\theta_B = 25$ $\theta_C = 35$ | $\theta_A = 32$ $\theta_B = 25$ $\theta_C = 35$ | $\theta_A = 32$ $\theta_B = 25$ $\theta_C = 35$ |
| Area $S_1$/area $S_2$ (%) | 73 | 75 | 85 | 88 |
| Snow performance | 105 | 107 | 106 | 104 |
| Wet performance | 103 | 105 | 105 | 103 |

According to Table 1 described above, by setting the inclination angle of the inclined groove in the first to fourth ranges R1 to R4 and the circumferential-direction distance Y/width-direction distance X in the above-mentioned numerical range, snow performance and wet performance are improved. It can be seen that the snow performance is improved by providing the shallow connecting groove 40. It can be seen that the snow performance and wet performance are improved by setting the area S1/area S2 to be from 75% to 85%.

Although the tire of the present technology has been described in detail above, the present technology is not limited to the embodiments and examples, and various improvements and changes may naturally be made without departing from the gist of the present technology.

The invention claimed is:
1. A tire, comprising:
  a tread pattern comprising an inclined groove group in which a plurality of sets of inclined grooves, which extends from a starting end in a center region including a tire equator line toward both sides in a tire width direction and toward a first side in a tire circumferential direction across the tire equator line to a pattern end of a tread portion, is disposed in the tire circumferential direction;
  a periphery distance from the tire equator line to the pattern end at one side in the tire width direction being L, an inclination angle of the inclined grooves with respect to the tire circumferential direction being
  (a) greater than 40 degrees and 50 degrees or less in a first range from the starting end to a position separated in the tire width direction by 35% of the periphery distance L,
  (b) greater than 50 degrees and 65 degrees or less in a second range from an outer side in the tire width direction of the position separated from the tire equator line in the tire width direction by 35% of the periphery distance L to a position separated from the tire equator line in the tire width direction by 50% of the periphery distance L,
  (c) greater than 65 degrees and 80 degrees or less in a third range from an outer side in the tire width direction of the position separated from the tire equator line in the tire width direction by 50% of the periphery distance L to a position separated from the tire equator line in the tire width direction by 70% of the periphery distance L, and

(d) greater than 80 degrees and 90 degrees or less in a fourth range from an outer side in the tire width direction of the position separated from the tire equator line in the tire width direction by 70% of the periphery distance L to a position separated from the tire equator line in the tire width direction by 100% of the periphery distance L, and a circumferential-direction distance along the tire circumferential direction from the starting end to a terminating end of the inclined grooves in the pattern end being from 60% to 90% of a width-direction distance along the tire width direction from the starting end to the terminating end; wherein the tread pattern includes a plurality of sipes provided in a region of a land portion between inclined grooves adjacent in the tire circumferential direction, and a value obtained by dividing a total length (mm) of lengths projected in the inclination direction A, which is inclined at an angle α (α=0 or more and less than 360 degrees) with respect to the tire width direction, of all grooves provided in the tread pattern by (ground contact width×circumferential length) (mm$^2$) is ρg, a value obtained by dividing a total length (mm) projected in the inclination direction A of all the sipes provided in the tire by (ground contact width×circumferential length) (mm$^2$) is ρs, an average depth (mm) of grooves is Dg, a snow traction index STI is defined by the following Formula (1), $$STI=-6.8+2202*\rho g+672*\rho s+7.6*Dg \qquad (1), and$$

a value of the snow traction index STI at the angle α=30 to 40 degrees is from 104% to 110% of a value of the snow traction index STI at the angle α=0 degrees.

2. A tire, comprising:

a tread pattern comprising an inclined groove group in which a plurality of sets of inclined grooves, which extends from a starting end in a center region including a tire equator line toward both sides in a tire width direction and toward a first side in a tire circumferential direction across the tire equator line to a pattern end of a tread portion, is disposed in the tire circumferential direction;

a periphery distance from the tire equator line to the pattern end at one side in the tire width direction being L, an inclination angle of the inclined grooves with respect to the tire circumferential direction being (a) greater than 40 degrees and 50 degrees or less in a first range from the starting end to a position separated in the tire width direction by 35% of the periphery distance L, (b) greater than 50 degrees and 65 degrees or less in a second range from an outer side in the tire width direction of the position separated from the tire equator line in the tire width direction by 35% of the periphery distance L to a position separated from the tire equator line in the tire width direction by 50% of the periphery distance L, (c) greater than 65 degrees and 80 degrees or less in a third range from an outer side in the tire width direction of the position separated from the tire equator line in the tire width direction by 50% of the periphery distance L to a position separated from the tire equator line in the tire width direction by 70% of the periphery distance L, and (d) greater than 80 degrees and 90 degrees or less in a fourth range from an outer side in the tire width direction of the position separated from the tire equator line in the tire width direction by 70% of the periphery distance L to a position separated from the tire equator line in the tire width direction by 100% of the periphery distance L, and a circumferential-direction distance along the tire circumferential direction from the starting end to a terminating end of the inclined grooves in the pattern end being from 60% to 90% of a width-direction distance along the tire width direction from the starting end to the terminating end; wherein the tread pattern includes two connecting grooves that connect two adjacent inclined grooves adjacent in the tire circumferential direction in the inclined groove group within a range separated from the tire equator line by from 15 to 55% of the periphery distance L in the tire width direction, each of the inclined grooves includes a crossing portion that crosses between two inclined grooves extending to an outer side in the tire width direction different from an outer side in the tire width direction in which each of the inclined grooves extends, and the crossing portion further crosses the tire equator line, the connecting grooves include a first connecting groove located at a side of the tire equator line and a second connecting groove located at an outer side of the first connecting groove in the tire width direction, the first connecting groove, the second connecting groove, and the crossing portion are inclined to the same side in the tire width direction from the tire circumferential direction, an inclination angle θC of the crossing portion with respect to the tire circumferential direction is greater than an inclination angle θA of the first connecting groove with respect to the tire circumferential direction, and the inclination angle θA is greater than an inclination angle θB of the second connecting groove with respect to the tire circumferential direction, and the inclination angle θB is from 0.6 to 0.8 times the inclination angle θA, and the inclination angle θA is from 0.75 to 0.95 times the inclination angle θC.

3. A tire, comprising:

a tread pattern comprising an inclined groove group in which a plurality of sets of inclined grooves, which extends from a starting end in a center region including a tire equator line toward both sides in a tire width direction and toward a first side in a tire circumferential direction across the tire equator line to a pattern end of a tread portion, is disposed in the tire circumferential direction;

a periphery distance from the tire equator line to the pattern end at one side in the tire width direction being L, an inclination angle of the inclined grooves with respect to the tire circumferential direction being (a) greater than 40 degrees and 50 degrees or less in a first range from the starting end to a position separated in the tire width direction by 35% of the periphery distance L, (b) greater than 50 degrees and 65 degrees or less in a second range from an outer side in the tire width direction of the position separated from the tire equator line in the tire width direction by 35% of the periphery distance L to a position separated from the tire equator line in the tire width direction by 50% of the periphery distance L, (c) greater than 65 degrees and 80 degrees or less in a third range from an outer side in the tire width direction of the position separated from the tire equator line in the tire width direction by 50% of the periphery distance L to a position separated from the tire equator line in the tire width direction by 70% of the periphery distance L, and (d) greater than 80 degrees and 90 degrees or less in a fourth range from an outer side in the tire width direction of the position separated from the tire equator line in the tire width direction by 70% of the periphery distance L to a position separated from the tire equator line in the tire width direction by 100% of the periphery distance L, and a circumferential-direction distance along the tire circumferential direction from the starting end to a terminating end of the inclined grooves in the pattern end being from 60% to 90% of a width-direction distance along the tire width direction from the starting end to the terminating end; wherein the tread pattern includes two connecting grooves that connect two adjacent inclined grooves adjacent in the tire circumferential direction in the inclined groove group within a range separated from the tire equator line by from 15 to 55% of the periphery distance L in the tire width direction, each of the inclined grooves includes a crossing portion that crosses between two inclined grooves extending to an outer side in the tire width direction different from an outer side in the tire width direction in which each of the inclined grooves extends, and the crossing portion further crosses the tire equator line, the connecting grooves include a first connecting groove located at a side of the tire equator line and a second connecting groove located at an outer side of the first connecting groove in the tire width direction, the first connecting groove, the second connecting groove, and the crossing portion are inclined to the same side in the tire width direction from the tire circumferential direction, an inclination angle θC of the crossing portion with respect to the tire circumferential direction is greater than an inclination angle θA of the first connecting groove with respect to the tire circumferential direction, and the inclination angle θA is greater than an inclination angle θB of the second connecting groove with respect to the tire circumferential direction, and the tread pattern includes a first block land portion surrounded by the adjacent inclined grooves, the crossing portion, and the first connecting groove and a second block land portion surrounded by the adjacent inclined grooves, the first connecting groove, and the second connecting groove between adjacent inclined grooves adjacent in the tire circumferential direction in the inclined groove group, and an area S1 of the first block land portion is smaller than an area S2 of the second block land portion.

4. A tire, comprising:
a tread pattern comprising an inclined groove group in which a plurality of sets of inclined grooves, which extends from a starting end in a center region including a tire equator line toward both sides in a tire width direction and toward a first side in a tire circumferential direction across the tire equator line to a pattern end of a tread portion, is disposed in the tire circumferential direction;
a periphery distance from the tire equator line to the pattern end at one side in the tire width direction being L, an inclination angle of the inclined grooves with respect to the tire circumferential direction being (a) greater than 40 degrees and 50 degrees or less in a first range from the starting end to a position separated in the tire width direction by 35% of the periphery distance L, (b) greater than 50 degrees and 65 degrees or less in a second range from an outer side in the tire width direction of the position separated from the tire equator line in the tire width direction by 35% of the periphery distance L to a position separated from the tire equator line in the tire width direction by 50% of the periphery distance L, (c) greater than 65 degrees and 80 degrees or less in a third range from an outer side in the tire width direction of the position separated from the tire equator line in the tire width direction by 50% of the periphery distance L to a position separated from the tire equator line in the tire width direction by 70% of the periphery distance L, and (d) greater than 80 degrees and 90 degrees or less in a fourth range from an outer side in the tire width direction of the position separated from the tire equator line in the tire width direction by 70% of the periphery distance L to a position separated from the tire equator line in the tire width direction by 100% of the periphery distance L, and a circumferential-direction distance along the tire circumferential direction from the starting end to a terminating end of the inclined grooves in the pattern end being from 60% to 90% of a width-direction distance along the tire width direction from the starting end to the terminating end; wherein the tread pattern includes a shallow connecting groove that connects two of adjacent inclined grooves adjacent in the tire circumferential direction in the inclined groove group within a range separated from the tire equator line by greater than 55% and 75% or less of the periphery distance L in the tire width direction, and the shallow connecting groove has a groove depth from 40 to 50% of a groove depth of the adjacent inclined grooves at connection positions where the adjacent inclined grooves are connected to the shallow connecting groove.

5. The tire according to claim 4, wherein
the inclined grooves extend to the pattern end without intersecting a circumferential main groove which extends in the tire circumferential direction and goes around a tire circumference, and
block land portions, which are each provided between the adjacent inclined grooves adjacent in the tire circumferential direction of the inclined grooves disposed in respective half-tread regions on both sides of the tire equator line, contact both of the adjacent inclined grooves.

6. The tire according to claim 4, wherein
each of the inclined grooves includes a crossing portion that crosses between two inclined grooves extending to an outer side in the tire width direction different from an outer side in the tire width direction in which each of the inclined grooves extends, and the crossing portion further crosses the tire equator line.

7. The tire according to claim 4, wherein
the tread pattern includes a plurality of sipes provided in a region of a land portion between the adjacent inclined grooves adjacent in the tire circumferential direction, and
a value obtained by dividing a total length (mm) of lengths projected in the inclination direction A, which is inclined at an angle α (α=0 or more and less than 360 degrees) with respect to the tire width direction, of all grooves provided in the tread pattern by (ground contact width×circumferential length) (mm²) is ρg, a value obtained by dividing a total length (mm) projected in the inclination direction A of all the sipes provided in the tire by (ground contact width×circumferential length) (mm²) is ρs, an average depth (mm) of grooves is Dg, a snow traction index STI is defined by the following Formula (1), $$STI = -6.8 + 2202 \cdot \rho g + 672 \cdot \rho s + 7.6 \cdot Dg \quad (1), \text{ and}$$

a value of the snow traction index STI at the angle α=30 to 40 degrees is from 104% to 110% of a value of the snow traction index STI at the angle α=0 degrees.

8. The tire according to claim 4, wherein
the tread pattern includes two connecting grooves that connect the two of the adjacent inclined grooves adjacent in the tire circumferential direction in the inclined groove group within a range separated from the tire equator line by from 15 to 55% of the periphery distance L in the tire width direction.

9. The tire according to claim 8, wherein
the connecting grooves extend toward the first side and toward an inner side in the tire width direction.

10. The tire according to claim 8, wherein
a portion of the connecting grooves crosses one of the adjacent inclined grooves, extends to a region of a land portion defined by the one of the adjacent inclined grooves, and is closed.

11. The tire according to claim 8, wherein
each of the inclined grooves includes a crossing portion that crosses between two inclined grooves extending to an outer side in the tire width direction different from an outer side in the tire width direction in which each of the inclined grooves extends, and the crossing portion further crosses the tire equator line,
the connecting grooves include a first connecting groove located at a side of the tire equator line and a second connecting groove located at an outer side of the first connecting groove in the tire width direction, and
the first connecting groove, the second connecting groove, and the crossing portion are inclined to the same side in the tire width direction from the tire circumferential direction, an inclination angle θC of the crossing portion with respect to the tire circumferential direction is greater than an inclination angle θA of the first connecting groove with respect to the tire circumferential direction, and the inclination angle θA is greater than an inclination angle θB of the second connecting groove with respect to the tire circumferential direction.

12. The tire according to claim 11, wherein
the inclination angle θB is from 0.6 to 0.8 times the inclination angle θA, and the inclination angle θA is from 0.75 to 0.95 times the inclination angle θC.

13. The tire according to claim 11, wherein
the tread pattern includes a first block land portion surrounded by the adjacent inclined grooves, the crossing portion, and the first connecting groove and a second block land portion surrounded by the adjacent inclined grooves, the first connecting groove, and the second connecting groove between the adjacent inclined grooves adjacent in the tire circumferential direction in the inclined groove group, and an area S1 of the first block land portion is smaller than an area S2 of the second block land portion.

14. The tire according to claim 13, wherein
the area S1 is from 75% to 85% of the area S2.

15. The tire according to claim 13, wherein
in a region of the first block land portion, a groove portion of one inclined groove of the inclined grooves at the starting end side from the crossing portion is provided as a starting groove portion, and
a distance along the tire width direction between a position of a first end of the first block land portion located farthest from the starting groove portion at the side of the tire equator line and a connection position where the starting groove portion is connected to one of the adjacent inclined grooves contacting the first block land portion is L1, a distance along the tire width direction between the first end of the first block land portion and a second end of the first block land portion located at the outermost side in the tire width direction is LB1, and the distance L1 is from 25% to 35% of the distance LB1.

16. The tire according to claim 15, wherein
a distance from the starting end of the starting groove portion to the connection position is L2, and the distance L2 is from 40% to 45% of the distance LB1.

17. The tire according to claim 13, wherein
in a region of the second block land portion, a closed groove that extends from one of the adjacent inclined grooves and is closed without being connected to the other of the adjacent inclined grooves is provided, and
a distance along the tire width direction between a third end of the second block land portion located farthest from the closed groove at the side of the tire equator line and a connection position where the closed groove is connected to the one of the adjacent inclined grooves is L3, a distance along the tire width direction between the third end of the second block land portion and a fourth end of the second block land portion located at the outermost side in the tire width direction is LB2, and the distance L3 is from 25% to 35% of the distance LB2.

18. The tire according to claim 17, wherein
a distance from a closed end of the closed groove to the connection position is L4, and the distance L4 is from 40% to 45% of the distance LB2.

* * * * *